United States Patent
Marusczyk et al.

(10) Patent No.: US 10,833,319 B2
(45) Date of Patent: Nov. 10, 2020

(54) ACTIVE MATERIAL FOR A POSITIVE ELECTRODE OF A BATTERY CELL, POSITIVE ELECTRODE, AND BATTERY CELL

(71) Applicant: Robert Bosch GmbH, Stuttgart (DE)

(72) Inventors: Anika Marusczyk, Stuttgart (DE); Thomas Eckl, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/760,470

(22) PCT Filed: Sep. 5, 2016

(86) PCT No.: PCT/EP2016/070798
§ 371 (c)(1),
(2) Date: Mar. 15, 2018

(87) PCT Pub. No.: WO2017/045941
PCT Pub. Date: Mar. 23, 2017

(65) Prior Publication Data
US 2018/0269473 A1    Sep. 20, 2018

(30) Foreign Application Priority Data
Sep. 16, 2015 (DE) .................. 10 2015 217 743

(51) Int. Cl.
*H01M 4/36* (2006.01)
*H01M 4/525* (2010.01)
(Continued)

(52) U.S. Cl.
CPC ........ *H01M 4/364* (2013.01); *C01G 45/1228* (2013.01); *C01G 51/42* (2013.01);
(Continued)

(58) Field of Classification Search
None
See application file for complete search history.

(56) References Cited

U.S. PATENT DOCUMENTS 5,789,114 A * 8/1998 Adachi ................ H01M 4/131
427/122
6,346,348 B1   2/2002 Nakajima et al.
(Continued)

FOREIGN PATENT DOCUMENTS

CN         104577088 A     4/2015
DE     102012208321 A1    11/2013
(Continued)

OTHER PUBLICATIONS

Mather, Glenn C. et al. "A Review of Cation-Ordered Rock Salt Superstructure Oxides". Journal of Materials Chemistry, vol. 10, No. 10, 2000, pp. 2219-2230. Royal Society of Chemistry (RSC), doi:10.1039/b000817f. (Year: 2000).*

(Continued)

*Primary Examiner* — Robert S Carrico
(74) *Attorney, Agent, or Firm* — Norton Rose Fulbright US LLP; Gerard Messina

(57) ABSTRACT

A positive active material for a positive electrode of a battery cell which includes a first component containing a compound of general formula: $Li_{2-z}Na_zM^1_{1-y}M^2_yO_3$, where $M^1$ and $M^2$ are different from one another and stand for transition metal ions, $0<y<1$, and $0 \leq z<2$, with the condition that the compound is essentially free of manganese ions. Moreover, a positive electrode of a battery cell which includes the positive material, and a battery cell which includes at least one positive electrode, are also described.

4 Claims, 2 Drawing Sheets

(51) Int. Cl.
| | |
|---|---|
| H01M 4/62 | (2006.01) |
| H01M 10/0525 | (2010.01) |
| H01M 4/131 | (2010.01) |
| H01M 4/485 | (2010.01) |
| C01G 45/12 | (2006.01) |
| C01G 51/00 | (2006.01) |
| C01G 53/00 | (2006.01) |
| H01M 4/505 | (2010.01) |
| H01M 4/02 | (2006.01) |

(52) U.S. Cl.
CPC ............ *C01G 53/42* (2013.01); *H01M 4/131* (2013.01); *H01M 4/366* (2013.01); *H01M 4/485* (2013.01); *H01M 4/505* (2013.01); *H01M 4/525* (2013.01); *H01M 4/625* (2013.01); *H01M 4/628* (2013.01); *H01M 10/0525* (2013.01); *C01P 2002/52* (2013.01); *C01P 2006/40* (2013.01); *H01M 2004/028* (2013.01); *Y02T 10/7011* (2013.01)

(56) References Cited

U.S. PATENT DOCUMENTS

| | | | |
|---|---|---|---|
| 2006/0051671 A1 | 3/2006 | Thackeray et al. | |
| 2007/0065723 A1* | 3/2007 | Takeda .................. | H01M 4/131 429/231.1 |
| 2010/0143799 A1* | 6/2010 | Park ...................... | H01M 4/485 429/219 |
| 2010/0151332 A1* | 6/2010 | Lopez ................... | H01M 4/131 429/231.95 |
| 2011/0200876 A1* | 8/2011 | Park ...................... | H01M 4/485 429/218.1 |
| 2013/0130103 A1* | 5/2013 | Kim ...................... | H01M 4/364 429/211 |
| 2014/0220455 A1 | 8/2014 | Lee et al. | |
| 2016/0344026 A1* | 11/2016 | Yabuuchi .............. | H01M 4/485 |

FOREIGN PATENT DOCUMENTS

| | | | | |
|---|---|---|---|---|
| DE | 102012214119 A1 | 2/2014 | | |
| EP | 2410600 A2 | 1/2012 | | |
| EP | 2728660 A1 | 5/2014 | | |
| JP | 10139444 A | * 5/1998 | ............ | H01M 4/485 |
| JP | 2010027386 A | * 2/2010 | | |
| JP | 2013062089 A | 4/2013 | | |
| WO | 2012176903 A1 | 12/2012 | | |
| WO | 2013120724 A1 | 8/2013 | | |
| WO | 2014164927 A1 | 10/2014 | | |
| WO | WO-2015133348 A1 | * 9/2015 | ............ | H01M 4/485 |

OTHER PUBLICATIONS

Mohan, P. et al. "Improved Electrochemical Properties of Chromium Substituted in $LiCr_{1-x}Ni_xO_2$ Cathode Materials for Rechargeable Lithium-Ion Batteries". Journal of Solid State Electrochemistry, vol. 16, No. 12, 2012, pp. 3695-3702. Springer Science and Business Media LLC, doi:10.1007/s10008-012-1808-2. (Year: 2012).*
International Search Report dated Jan. 12, 2017, of the corresponding International Application PCT/EP2016/070798 filed Sep. 5, 2016.
Sarkar, et al.: "Lithium Rich Composition of $Li_2RuO_3$ and $Li_2Ru_{1-x}Ir_xO_3$ Layered Materials as Li-Ion Battery Cathode", Journal of The Electrochemical Society 161(6), (2014), pp. A934-A942.

* cited by examiner

ACTIVE MATERIAL FOR A POSITIVE ELECTRODE OF A BATTERY CELL, POSITIVE ELECTRODE, AND BATTERY CELL

The present invention relates to a positive active material (A) for a positive electrode of a battery cell which includes a first component (A1) containing $Li_2M^1_{1-y}M^2_yO_3$, $M^1$ and $M^2$ independently standing for transition metal ions that are not manganese ions. Moreover, the present invention relates to a positive electrode of a battery cell which includes an active material (A) according to the present invention, and a battery cell which includes at least one positive electrode according to the present invention.

BACKGROUND INFORMATION

The storage of electrical energy has become increasingly important in recent decades. Electrical energy may be stored with the aid of batteries. Batteries convert chemical reaction energy into electrical energy. A distinction is made between primary batteries and secondary batteries. Primary batteries are non-rechargeable, while secondary batteries, also referred to as accumulators, are rechargeable. A battery includes one or multiple battery cells.

In particular so-called lithium-ion battery cells are used in an accumulator. They are characterized, among other features, by high energy densities, thermal stability, and extremely low self-discharge.

Lithium-ion battery cells include a positive electrode and a negative electrode. The positive and negative electrodes each include a current collector, to which a positive or negative active material is applied. The positive and negative active material is capable of reversible intercalation and deintercalation of lithium ions.

The active material for the negative electrode is, for example, amorphous silicon which may form alloy compounds with lithium atoms. However, carbon compounds such as graphite are also widely used as active material for negative electrodes. Lithium atoms are intercalated into the active material of the negative electrode.

A lithium-containing metal oxide or a lithium-containing metal phosphate is generally used as active material for the positive electrode. In particular in applications in which a high energy density is necessary, so-called high-energy materials such as high-energy (HE) nickel-cobalt-manganese (NCM) electrodes (for example, $LiMO_2$: $Li_2MnO_3$, where M=Ni, Co, Mn) are used. A generic battery that uses such an HE-NCM electrode is described in German Patent Application No. DE 10 2012 208 321 A1, for example.

During operation of the battery cell, i.e., during a discharging operation, electrons flow in an external circuit from the negative electrode to the positive electrode. During a discharging operation, lithium ions migrate from the negative electrode to the positive electrode within the battery cell. In the process, the lithium ions are reversibly deintercalated from the active material of the negative electrode, also referred to as delithiation. During a charging operation of the battery cell, the lithium ions migrate from the positive electrode to the negative electrode. In the process, the lithium ions are reversibly reintercalated into the active material of the negative electrode, also referred to as lithiation.

The electrodes of the battery cell have a foil-like design and are wound to form an electrode winding, with a separator situated in between which separates the negative electrode from the positive electrode. Such an electrode winding is also referred to as a "jelly roll." The electrodes may also be layered one above the other to form an electrode stack.

The two electrodes of the electrode winding or of the electrode stack are electrically connected with the aid of collectors to poles of the battery cell, also referred to as terminals. A battery cell generally includes one or multiple electrode windings or electrode stacks. The electrodes and the separator are surrounded by an electrolyte composition which is generally liquid. The electrolyte composition is conductive for the lithium ions, and allows transport of the lithium ions between the electrodes.

U.S. Patent Appl. Pub. No. 2006/0051671 A1 describes manganese oxide-containing electrodes for lithium-ion batteries in which a portion of the manganese oxide is replaced by other transition metals. The active material of the electrode includes a compound of general formula x $Li_2MnO_3$: (1-x) $LiMn_{2-y}M_yO_4$, where 0<x<1 and 0≤y<1, and M stands for at least one metal ion.

European Patent No. EP 2 728 660 A1 describes lithium-ion batteries that contain electrodes which as active material include a compound of formula $Li_{(1+y)}[Ni_aCo_bMn_c]_{(1-y)}O_{2+e}$, where y has the meaning 0 to 0.3; a, b, and c may independently assume values of 0 to 0.8, where a+b+c=1, and −0.1=e≤0.1.

However, these and conventional HE-NCM materials are characterized in that they deliver high cell voltages at the beginning of the service life of the cell, but over the service life are subject to significant losses (so-called "voltage fade"). The same applies for the capacity of the cell (so-called "capacity fade"). The object of the present invention, therefore, is to provide an active material for a positive electrode, which has a high cell voltage and capacity even after a long service time of the cell.

SUMMARY

An active material (A) for a positive electrode of a battery cell, in particular for a lithium-ion battery cell, is provided which includes a first component (A1) containing a compound of general formula (I):

$$Li_2M^1_{1-y}M^2_yO_3 \quad (I)$$

where $M^1$ and $M^2$ are different from one another and stand for transition metal ions, and

with the condition that the compound of formula (I) is essentially free of manganese ions.

This means that the proportion of manganese ions in this component is less than 1 atom %, in particular less than 0.5 atom %.

The value of y is not particularly limited, and may be freely selected in the stated range. It is preferred that 0.3=y≤0.7, in particular 0.4≤y≤0.6.

$M^1$ and $M^2$ are preferably independently selected from transition metal ions that have an ion radius similar to $Mn^{4+}$. The transition metal ions preferably have an ion radius of 40 pm to 70 pm, in particular an ion radius of 50 pm to 70 pm.

In addition, it is preferred that at least one of the transition metal ions $M^1$ or $M^2$ is redox-active at high voltages, in particular at voltages greater than 4.5 V with respect to $Li/Li^+$.

Cations of the elements nickel, chromium, and molybdenum are particularly preferred, since they meet the stated conditions (i.e., they have a suitable ion radius and are also redox-active), and in addition are relatively inexpensive, and the specific capacity of the battery cell is not adversely affected due to their weight, which is not very high.

In preferred specific embodiments, combinations of nickel cations with molybdenum cations as well as of nickel cations with chromium cations are used. Components (A1) particularly preferably include $Li_2Ni_{0.5}Mo_{0.5}O_3$ and/or $Li_2Ni_{0.5}Cr_{0.5}O_3$. Without being bound to theoretical aspects, it is assumed that the redox pair $Ni^{2+}/Ni^{4+}$ is responsible for the redox-active behavior in the compound $Li_2Ni_{0.5}Mo_{0.5}O_3$. In addition, it is assumed that, in contrast, the chromium ions are responsible for the redox-active behavior in the compound $Li_2Ni_{0.5}Cr_{0.5}O_3$.

According to one advantageous embodiment of the present invention, component (A1) is additionally doped with sodium ions, a portion of the lithium ions of component (A1) being replaced by sodium ions. The rate capability of active material (A) is thus positively influenced. The advantageous embodiment therefore includes a component (A1) of general formula (II):

$$Li_{2-z}Na_zM^1_{1-y}M^2_yO_3 \quad (II)$$

where $M^1$, $M^2$, and y have the meanings defined above, and $0 \leq z < 2$. It is preferred that $0.1 \leq z \leq 1$.

Active material (A) preferably includes a second component (A2) that contains $LiM^3O_2$. $M^3$ is a transition metal preferably selected from the elements nickel, cobalt, and manganese. Active material (A), which includes components (A1) and (A2), allows a relatively large capacity of the battery cell combined with a relatively high voltage.

An active material (A) according to the present invention for a positive electrode is thus generally obtained, with a first component (A1) containing the metal oxide $Li_{2-z}Na_zM^1_{1-y}M^2_yO_3$, and with a second component (A2) containing the NCM compound $LiM^3O_2$ according to following formula (III):

$$x(LiM^3O_2):(1-x)(Li_{2-z}Na_zM^1_{1-y}M^2_yO_3) \quad (III)$$

where $M^1$, $M^2$, y, and z have the meanings defined above, and $1 > x \geq 0$. It is preferred that $1 > x > 0$, in particular $0.8 \geq x \geq 0.2$.

In order to activate initially inactive first component (A1) of active material (A) of the positive electrode containing the metal oxide $Li_{2-z}Na_zM^1_{1-y}M^2_yO_3$, the active material must be subjected to forming by a conventional method. The forming of the battery cell takes place, for example, by applying a defined voltage to the battery cell for the first time, a defined current flowing through the battery cell for the first time. Such a method for forming a battery cell, in which formation currents for activating electrochemical processes in the battery cell are applied, is described in German Patent Application No. DE 10 2012 214 119 A1, for example.

In conventional HE-NCM materials, metal oxides of formula $Li_2MO_3$, where M stands for manganese cations as well as combinations of manganese cations with other transition metal cations, are used as active materials. $Mn^{4+}$ ions are redox-inactive, and thus do not take part in the charge compensation of the cell during the forming of the battery cell and also during the charging and discharging during subsequent operation of the battery cell. For this reason, in conventional active materials the oxygen ions are forced to take part in the charge compensation. This results in irreversible oxygen loss in the active material, which is accompanied by destabilization of the material due to the resulting defects in the material structure of the active material. This destabilization is further intensified by rearrangements and migrations of transition metal ions in the positive active material, in particular the migration of manganese ions.

These problems may be reduced or prevented by replacing manganese-containing active material of formula $Li_2MO_3$ by active material (A) according to the present invention. In contrast to the manganese ions, at least one of the transition metal ions $M^1$ or $M^2$ in component (A1) of the active material is redox-active, and thus contributes to the charge compensation during the lithiation or delithiation. The oxygen does not take part in this reaction as a redox partner. Thus, there is no oxygen loss, and also no destabilization of the material structure. In addition, the undesirable migration of transition metal ions in the active material is thus reduced or prevented. This results in stabilization of the capacity and voltage level, since the active material is subject to fewer changes.

Moreover, a positive electrode of a battery cell is provided which includes an active material (A) according to the present invention. In addition to active material (A), the positive electrode includes in particular a current collector on which active material (A) is applied. A metal foil, for example a copper or aluminum foil, is preferably used as the current collector. In addition, additives may be added to active material (A) prior to the application on the current collector. Named in particular are conductive additives such as conductive carbon black and binders such as styrene-butadiene copolymer (SBR), polyvinylidene fluoride (PVDF), polytetrafluoroethene (PTFE), and ethylene propylene diene terpolymer (EPDM).

According to one advantageous refinement of the present invention, a coating containing aluminum fluoride ($AlF_3$) is applied to active material (A) of the positive electrode. A coating containing aluminum fluoride ($AlF_3$) on active material (A) of the positive electrode has a positive effect on the capacity of the battery cell.

In particular, the coating prevents or reduces contact of active material (A) of the positive electrode with an electrolyte composition contained in the battery cell. Elutriation of transition metals from active material (A) of the positive electrode and migration of elutriated transition metals to the negative electrode of the battery cell are likewise prevented or reduced.

According to another advantageous refinement of the present invention, a coating containing carbon is applied to active material (A) of the positive electrode. Such a coating ensures homogeneous electronic contacting of the positive electrode.

The $AlF_3$-containing coating and the carbon-containing coating may also be applied to active material (A) of the positive electrode together, in particular one above the other, i.e., in layers.

Furthermore, a battery cell is provided which includes at least one positive electrode according to the present invention. In addition, the battery cell includes at least one negative electrode, and an electrolyte composition that allows the transport of the lithium ions from one electrode to the other. To avoid direct contact between the electrodes, the battery cell also preferably includes at least one separator situated between the electrodes. The separator preferably contains polymers such as polyolefins, polyesters, and fluorinated polymers. Particularly preferred polymers are polyethylene (PE), polypropylene (PP), polyethylene terephthalate (PET), polytetrafluoroethene (PTFE), and polyvinylidene fluoride (PVDF).

A battery cell according to the present invention is advantageously used in an electric vehicle (EV), in a hybrid vehicle (HEV), in a plug-in hybrid vehicle (PHEV), in a tool, or in a consumer electronic product. Tools are understood in particular to mean tools for home use and garden tools. Consumer electronic products are understood in particular to mean mobile telephones, tablet PCs, or notebooks.

Due to the use of an active material (A) that includes a first component (A1) of formula $Li_{2-z}Na_zM^1{}_{1-y}M^2{}_yO_3$ that is essentially free of manganese ions, an active material (A) for positive electrodes of battery cells may be provided which ensures a stable voltage over a relatively long time period and a large number of cycles when used in a lithium-ion battery cell. Likewise, the capacity of the lithium-ion battery cell remains stable over a relatively long time period and a large number of cycles. Losses in voltage and capacity are significantly reduced. The service life of the battery is thus increased, thus enabling commercial use in particular of lithium-ion batteries with an NCM compound in active material (A) of the positive electrode.

BRIEF DESCRIPTION OF THE DRAWINGS

Specific embodiments of the present invention are explained in greater detail with reference to the drawings and the following description.

DETAILED DESCRIPTION OF EXAMPLE EMBODIMENTS

Figure 1:
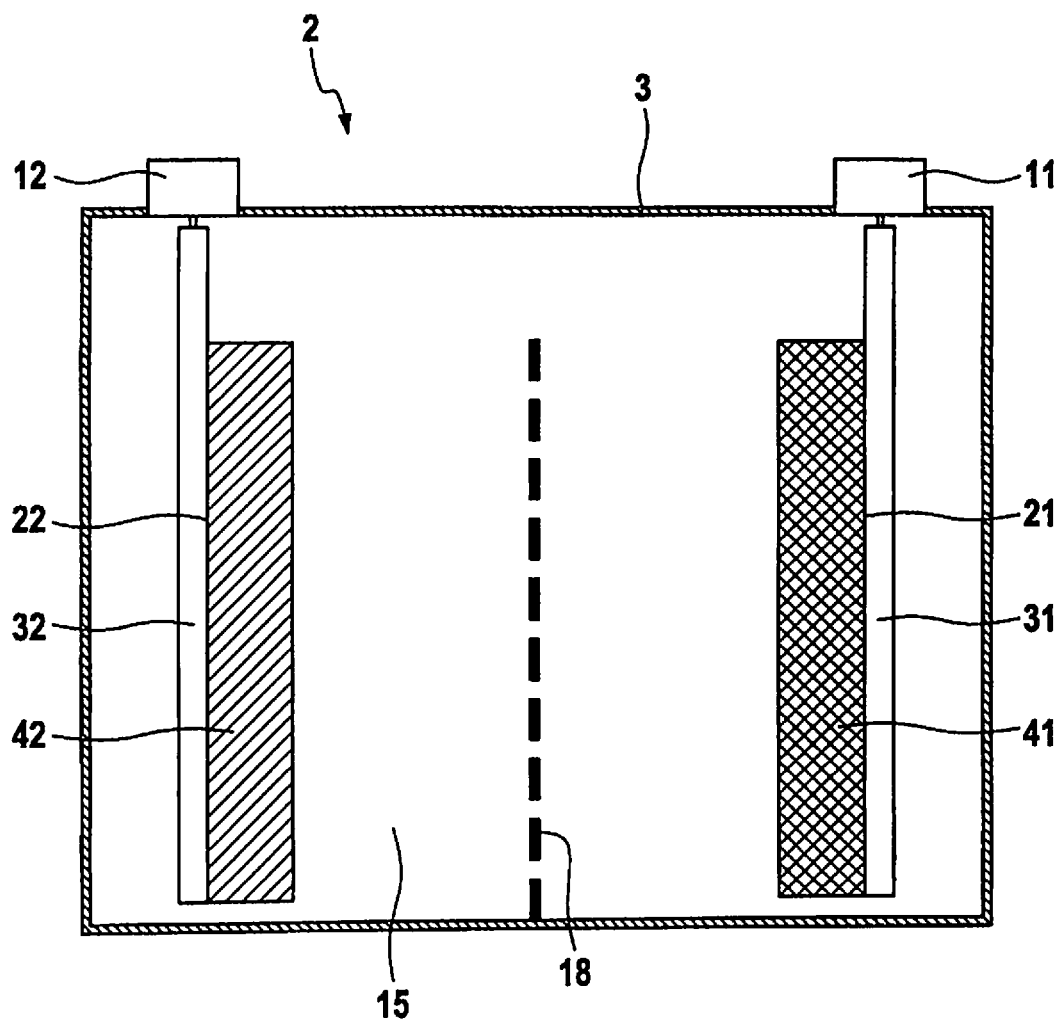
FIG. 1 shows a schematic illustration of a battery cell.

A battery cell 2 is schematically illustrated in FIG. 1. Battery cell 2 includes a cell housing 3 having a prismatic design, in the present case a cuboidal design. In the present case, cell housing 3 has an electrically conductive design and is made of aluminum, for example. However, cell housing 3 may also be made of an electrically insulating material, for example plastic.

Battery cell 2 includes a negative terminal 11 and a positive terminal 12. A voltage provided by battery cell 2 may be tapped via terminals 11, 12. In addition, battery cell 2 may also be charged via terminals 11, 12. Terminals 11, 12 are situated spaced apart from one another on a top surface of prismatic cell housing 3.

An electrode winding which includes two electrodes, namely, a negative electrode 21 and a positive electrode 22, is situated within cell housing 3 of battery cell 2. Negative electrode 21 and positive electrode 22 each have a foil-like design, and are wound to form an electrode winding with a separator 18 situated in between. It is also possible to provide multiple electrode windings in cell housing 3. An electrode stack, for example, may also be provided instead of the electrode winding.

Negative electrode 21 includes a negative active material 41 which has a foil-like design. Negative active material 41 contains silicon or a silicon-containing alloy as the base material.

Negative electrode 21 also includes a current collector 31, which likewise has a foil-like design. Negative active material 41 and current collector 31 are placed flatly against one another and joined together. Current collector 31 of negative electrode 21 has an electrically conductive design and is made of a metal, for example copper. Current collector 31 of negative electrode 21 is electrically connected to negative terminal 11 of battery cell 2.

In the present case, positive electrode 22 is a high-energy (HE) nickel-cobalt-manganese (NCM) electrode. Positive electrode 22 includes a positive active material (A) 42 which is present in particle form. Additives, in particular conductive carbon black and binder, are situated between the particles of positive active material (A) 42. Positive active material (A) 42 and the additives form a composite which has a foil-like design.

Positive active material (A) 42 includes a first component (A1) containing $Li_2Ni_{0.5}Mo_{0.5}O_3$ or $Li_2Ni_{0.5}Cr_{0.5}O_3$, for example. First component (A1) may be additionally doped with sodium ions, so that a portion of the lithium ions is replaced by sodium ions.

Positive active material (A) 42 also includes a second component (A2) containing an NCM compound, namely, $LiM^3O_2$. $M^3$ is a transition metal selected in particular from nickel, cobalt, and manganese. Further components of positive active material (A) 42 are in particular PVDF binder, graphite, and carbon black.

Positive electrode 22 also includes a current collector 32 which likewise has a foil-like design. The composite, made up of positive active material (A) 42 and the additives, and current collector 32 are placed flatly against one another and joined together. Current collector 32 of positive electrode 22 has an electrically conductive design and is made of a metal, for example aluminum. Current collector 32 of positive electrode 22 is electrically connected to positive terminal 12 of battery cell 2.

Negative electrode 21 and positive electrode 22 are separated from one another by separator 18. Separator 18 likewise has a foil-like design. Separator 18 has an electronically insulating design, but is ionically conductive, i.e., is permeable for lithium ions.

Cell housing 3 of battery cell 2 is filled with a liquid aprotic electrolyte composition 15 or with a polymer electrolyte. Electrolyte composition 15 surrounds negative electrode 21, positive electrode 22, and separator 18. Electrolyte composition 15 is also ionically conductive, and includes, for example, a mixture of at least one cyclic carbonate (for example, ethylene carbonate (EC), propylene carbonate (PC), butylene carbonate (BC)) and at least one linear carbonate (for example, dimethylene carbonate (DMC), diethyl carbonate (DEC), methylethyl carbonate (MEC)) as solvent, and a lithium salt ($LiPF_6$, $LiBF_4$, for example) as additive.

Figure 2:
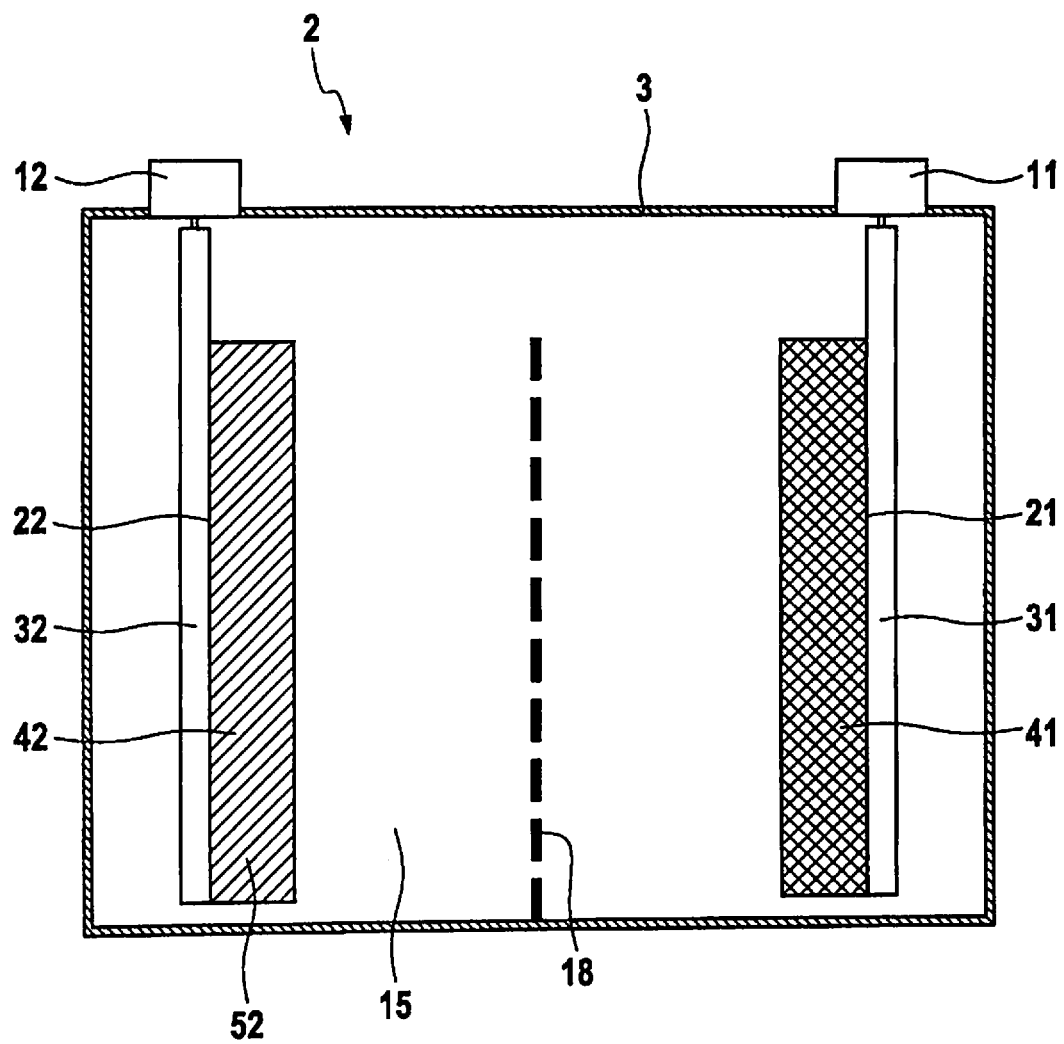
FIG. 2 shows a schematic illustration of a modification of the battery cell from FIG. 1.

FIG. 2 schematically illustrates a modification of battery cell 2 from FIG. 1. Modified battery cell 2 likewise includes a cell housing 3 which has a prismatic design, in the present case a cuboidal design. Battery cell 2 is very similar to battery cell 2 from FIG. 1. Therefore, in particular differences from battery cell 2 from FIG. 1 are discussed below.

A coating 52 is applied to the particles of positive active material (A) 42. The particles of positive active material (A) 42 are enclosed by coating 52. Coating 52 thus envelops the particles of positive active material (A) 42.

In the present case, coating 52 contains aluminum fluoride ($AlF_3$). Coating 52 prevents or reduces contact of positive active material (A) 42 with electrolyte composition 15 contained in cell housing 3 of battery cell 2. Elutriation of transition metals from positive active material (A) 42 and migration of elutriated transition metals to negative electrode 21 of battery cell 2 are likewise prevented or reduced.

Coating 52 may also contain carbon. A coating 52 of this type ensures homogeneous electronic contacting of positive electrode 22. Coating 52 may in particular have a multilayer design, and, for example, may contain a layer of aluminum fluoride ($AlF_3$) and a layer of carbon.

The present invention is not limited to the exemplary embodiments described here and the aspects highlighted therein. Rather, numerous modifications within the range set forth in the claims are possible which are within the scope of activities carried out by those skilled in the art.

What is claimed is:

1. A positive active material for a positive electrode of a battery cell, the positive active material including a first component containing a compound of general formula:

$$Li_{2-z}Na_zNi_{1-y}Cr_yO_3;$$

wherein
$0<y<1$, and
$0\leq z\leq 2$,
with a condition that the compound is essentially free of manganese ions.

2. The positive active material as recited in claim 1, wherein the compound is $Li_2Ni_{0.5}Cr_{0.5}O_3$.

3. The positive active material as recited in claim 1, wherein $0.1\leq z\leq 1$.

4. The positive active material as recited in claim 1, wherein the positive active material includes a second component containing $LiM^3O_2$, $M^3$ being a transition metal selected from the elements nickel (Ni), cobalt (Co), or manganese (Mn).

* * * * *